(12) United States Patent
Zaremba et al.

(10) Patent No.: US 10,005,348 B1
(45) Date of Patent: Jun. 26, 2018

(54) VEHICLE CANOPY EXTENSION

(71) Applicant: Textron Inc., Providence, RI (US)

(72) Inventors: Matthew Zaremba, Evans, GA (US); Matthew Jayne, North Augusta, SC (US); Mike Hebert, Evans, GA (US)

(73) Assignee: Textron Innovations Inc., Providence, RI (US)

(*) Notice: Subject to any disclaimer, the term of this patent is extended or adjusted under 35 U.S.C. 154(b) by 0 days. days.

(21) Appl. No.: 15/584,537

(22) Filed: May 2, 2017

(51) Int. Cl.
| B62D 25/06 | (2006.01) |
| B60J 7/16 | (2006.01) |
| B60J 7/19 | (2006.01) |
| B60J 7/11 | (2006.01) |
| B60J 7/047 | (2006.01) |
| B60J 7/10 | (2006.01) |
| B62J 17/08 | (2006.01) |
| B60J 7/00 | (2006.01) |
| B60J 11/06 | (2006.01) |
| B60J 7/02 | (2006.01) |

(52) U.S. Cl.
CPC ........... *B60J 7/1642* (2013.01); *B60J 7/0084* (2013.01); *B60J 7/022* (2013.01); *B60J 7/047* (2013.01); *B60J 7/106* (2013.01); *B60J 7/11* (2013.01); *B60J 7/194* (2013.01); *B60J 7/196* (2013.01); *B60J 11/06* (2013.01); *B62J 17/08* (2013.01); *B62D 25/06* (2013.01)

(58) Field of Classification Search
CPC .... B62D 25/06; B62D 25/0625; B62D 25/07; B60J 7/16; B60J 7/1642; B60J 7/0084; B60J 7/022; B60J 7/047; B60J 7/106; B60J 7/11; B60J 7/194; B60J 7/196; B60J 11/06; B62J 17/04; B62J 17/08

USPC .......................................... 296/102, 210, 213
See application file for complete search history.

(56) References Cited

U.S. PATENT DOCUMENTS

| 1,395,129 A | * | 10/1921 | McCorkindale | B60J 7/041 296/100.04 |
| 2,696,825 A | * | 12/1954 | McDonald | B60J 11/00 135/124 |
| 3,712,664 A | * | 1/1973 | May | B60R 21/131 296/102 |

(Continued)

OTHER PUBLICATIONS

Arctic Cat, Inc., Arctic Cat online store, Screen shot of Hard Top Rear Extension product for sale, 1 page.

(Continued)

*Primary Examiner* — Gregory A Blankenship
(74) *Attorney, Agent, or Firm* — Sandberg Phoenix & von Gontard P.C.

(57) ABSTRACT

A canopy extension system attachable to a vehicle main passenger compartment canopy. The canopy extension system comprises an extension panel connectable to a main canopy of a vehicle. The extension panel comprises a head section structured to overlap at least a portion of, and connect to, at least one of the main canopy and at least one main canopy support strut, and a cantilever tail section structured to be cantilevered from an edge of the main canopy when the head section is connected to the main canopy. The canopy extension system additionally comprises at least one connector assembly structured to connect the head section to the main canopy such that the cantilever tail section will be cantilevered from the edge of the main canopy.

20 Claims, 6 Drawing Sheets

(56) References Cited

U.S. PATENT DOCUMENTS

| | | | | |
|---|---|---|---|---|
| 5,190,340 | A | * | 3/1993 | Nuscher ................ B62B 5/0013 135/88.09 |
| 6,220,657 | B1 | * | 4/2001 | Rea ............................ B60J 7/04 296/216.03 |
| 6,692,058 | B1 | * | 2/2004 | Micco ........................ B60J 7/04 135/88.01 |
| 7,175,224 | B2 | * | 2/2007 | Held ....................... B62D 33/06 135/88.07 |
| 2014/0084621 | A1 | * | 3/2014 | DeVoss, Jr. ............ B60J 1/2011 296/135 |

OTHER PUBLICATIONS

Can Am BRP, Can Am online store, Screen shot of sport roof with skylight product for sale, 1 page.

\* cited by examiner

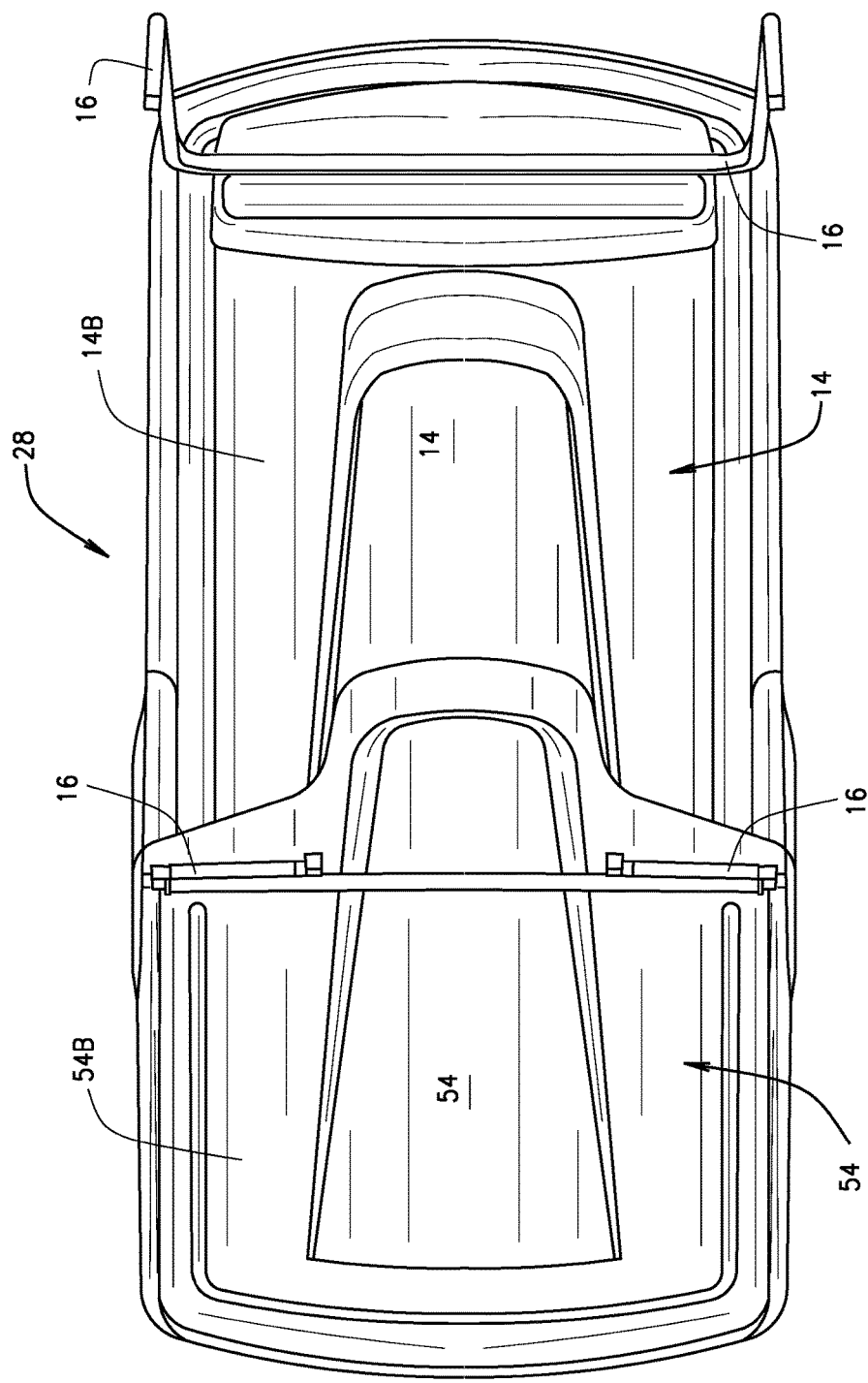

VEHICLE CANOPY EXTENSION

FIELD

The present teachings relate to the conversion of golf carts for consumer applications, and more particularly to systems and methods for extending the length of a golf cart canopy to cover added rear seating when the golf cart is converted to a lightweight personal transportation vehicle.

BACKGROUND

The statements in this section merely provide background information related to the present disclosure and may not constitute prior art.

Golf carts are often repurposed for use in consumer applications, e.g., repurposed as lightweight personal transportation vehicles, wherein the vehicles are modified by adding rear facing seats to accommodate additional passengers. Additionally, in various instances the existing canopy covering just the driver's cabin area, e.g., just the front seat, is replaced with a larger, longer canopy to cover the additional rear seating. In such instances, the old existing (standard size) canopy and corresponding support struts are removed and discarded and replaced with a larger, longer canopy that is supported by new and additional struts that must be mounted to the vehicle body and/or framework.

It is estimated that as many as 100,000 golf carts per year are repurposed for consumer applications having the additional rear seating. Therefore, many thousands of golf cart canopies (and corresponding support struts) are removed, discarded and replaced. The conversion is costly and environmentally unfriendly in that the removed canopies and struts must be discarded and disposed of.

SUMMARY

In various embodiments, the present disclosure provides a canopy extension system attachable to a vehicle main passenger compartment canopy, wherein the canopy extension system comprises an extension panel connectable to a main canopy of a vehicle. In various instances, the extension panel comprises a head section that is structured to overlap at least a portion of, and connect to, at least one of the main canopy and at least one main canopy support strut, and a cantilever tail section that is structured to be cantilevered from an edge of the main canopy when the head section is connected to the main canopy and/or at least one main canopy support strut. The canopy extension system additionally comprises at least one connector assembly that is structured to connect the head section to the main canopy such that the cantilever tail section will be cantilevered from the edge of the main canopy.

While the present disclosure is generally directed to a light weight passenger vehicle, it should be understood that the features disclosed herein can have application to most lightweight vehicles, e.g., maintenance vehicles, cargo vehicles, shuttle/service vehicles, golf carts, other all-terrain vehicles (ATVs), utility task vehicles (UTVs), recreational off-highway vehicles (ROVs), side-by-side vehicles (SSV), worksite vehicles, buggies, motorcycles, watercrafts, snowmobiles, tactical vehicles, etc.

This summary is provided merely for purposes of summarizing various example embodiments of the present disclosure so as to provide a basic understanding of various aspects of the teachings herein. Various embodiments, aspects, and advantages will become apparent from the following detailed description taken in conjunction with the accompanying drawings which illustrate, by way of example, the principles of the described embodiments. Accordingly, it should be understood that the description and specific examples set forth herein are intended for purposes of illustration only and are not intended to limit the scope of the present teachings.

DRAWINGS

The drawings described herein are for illustration purposes only and are not intended to limit the scope of the present teachings in any way.

FIG. 6 is a bottom view of the cantilevered canopy extension system shown in FIG. 1 illustrating the extension panel connected to a bottom surface of the main passenger compartment canopy of the vehicle, in accordance with various embodiments of the present disclosure.

Corresponding reference numerals indicate corresponding parts throughout the several views of drawings.

DETAILED DESCRIPTION

Figure 1:
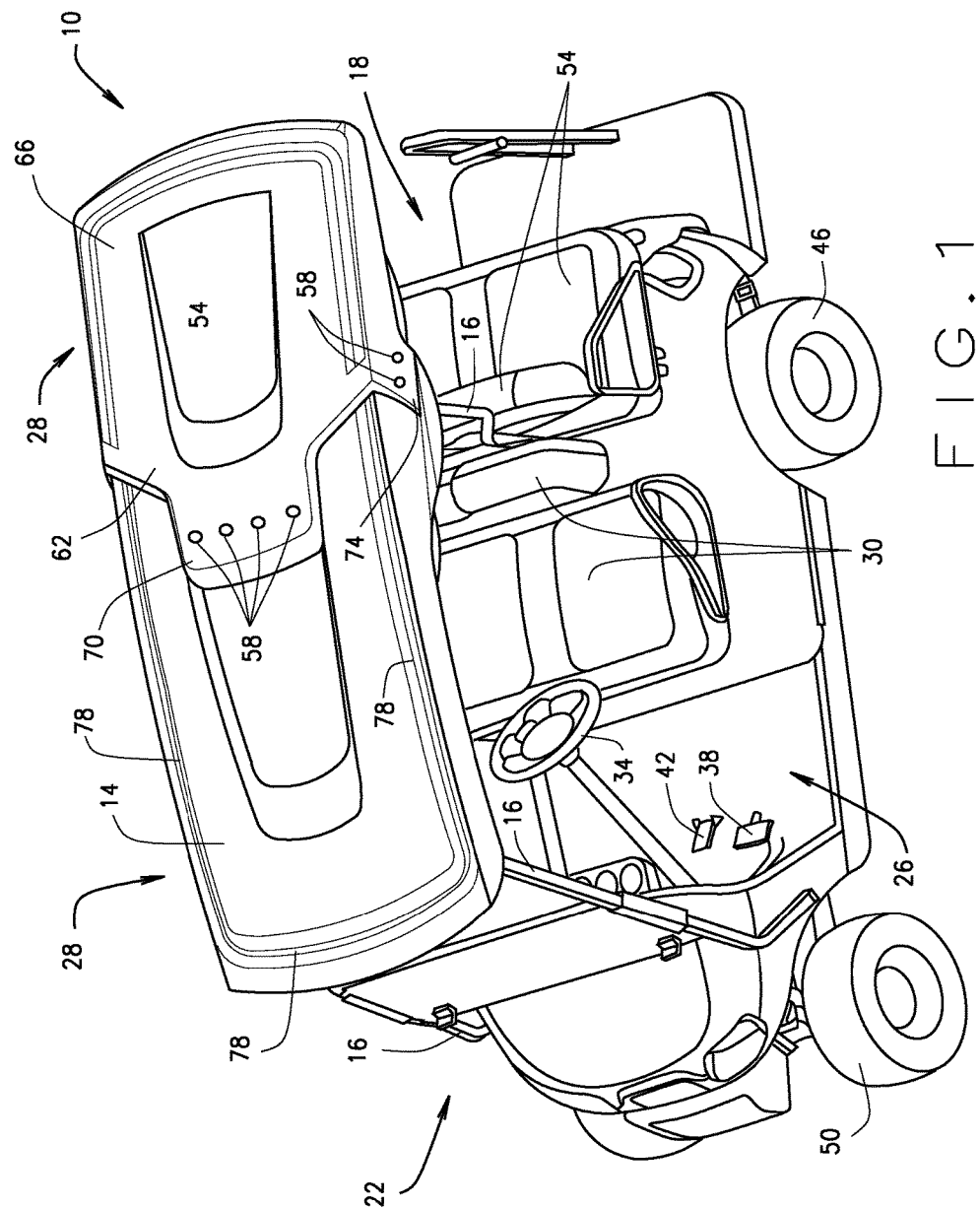
FIG. 1 is an isometric view of a vehicle including a cantilevered canopy extension system, in accordance with various embodiments of the present disclosure.

The following description is merely exemplary in nature and is in no way intended to limit the present teachings, application, or uses. Throughout this specification, like reference numerals will be used to refer to like elements. Additionally, the embodiments disclosed below are not intended to be exhaustive or to limit the invention to the precise forms disclosed in the following detailed description. Rather, the embodiments are chosen and described so that others skilled in the art can utilize their teachings. As well, it should be understood that the drawings are intended to illustrate and plainly disclose presently envisioned embodiments to one of those skilled in the art, but are not intended to be manufacturing level drawings or renditions of final products and may include simplified conceptual views to facilitate understanding or explanation. As well, the relative size and arrangement of the components may differ from that shown and still operate within the spirit of the invention.

As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims.

Unless otherwise defined, all technical and scientific terms used herein have the same meaning as commonly understood by one of ordinary skill in the art to which this disclosure belongs. The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps can be employed.

When an element, object, device, apparatus, component, region or section, etc., is referred to as being "on," "engaged to or with," "connected to or with," or "coupled to or with" another element, object, device, apparatus, component, region or section, etc., it can be directly on, engaged, connected or coupled to or with the other element, object, device, apparatus, component, region or section, etc., or intervening elements, objects, devices, apparatuses, components, regions or sections, etc., can be present. In contrast, when an element, object, device, apparatus, component, region or section, etc., is referred to as being "directly on," "directly engaged to," "directly connected to," or "directly coupled to" another element, object, device, apparatus, component, region or section, etc., there may be no intervening elements, objects, devices, apparatuses, components, regions or sections, etc., present. Other words used to describe the relationship between elements, objects, devices, apparatuses, components, regions or sections, etc., should be interpreted in a like fashion (e.g., "between" versus "directly between," "adjacent" versus "directly adjacent," etc.).

As used herein, the term "and/or" includes any and all combinations of one or more of the associated listed items. For example, A and/or B includes A alone, or B alone, or both A and B.

Although the terms first, second, third, etc. can be used herein to describe various elements, objects, devices, apparatuses, components, regions or sections, etc., these elements, objects, devices, apparatuses, components, regions or sections, etc., should not be limited by these terms. These terms may be used only to distinguish one element, object, device, apparatus, component, region or section, etc., from another element, object, device, apparatus, component, region or section, etc., and do not necessarily imply a sequence or order unless clearly indicated by the context.

Moreover, it will be understood that various directions such as "upper", "lower", "bottom", "top", "left", "right", "first", "second" and so forth are made only with respect to explanation in conjunction with the drawings, and that components may be oriented differently, for instance, during transportation and manufacturing as well as operation. Because many varying and different embodiments may be made within the scope of the concept(s) herein taught, and because many modifications may be made in the embodiments described herein, it is to be understood that the details herein are to be interpreted as illustrative and non-limiting.

Figure 2:
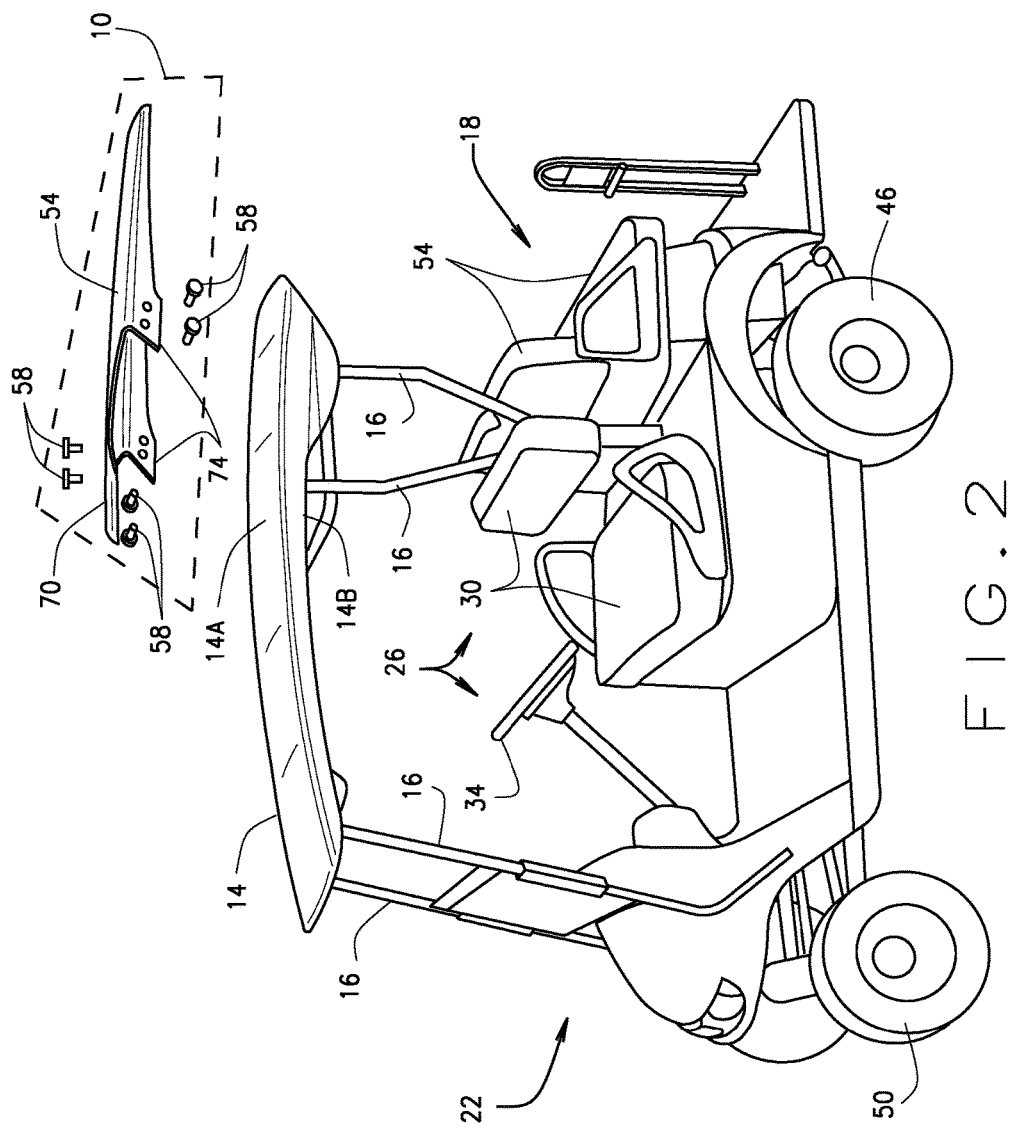
FIG. 2 is an exploded view of the vehicle and cantilevered canopy extension system shown in FIG. 1, illustrating that the cantilevered canopy extension system can be attached to an existing main passenger compartment canopy of the vehicle, in accordance with various embodiments of the present disclosure.
Figure 4:
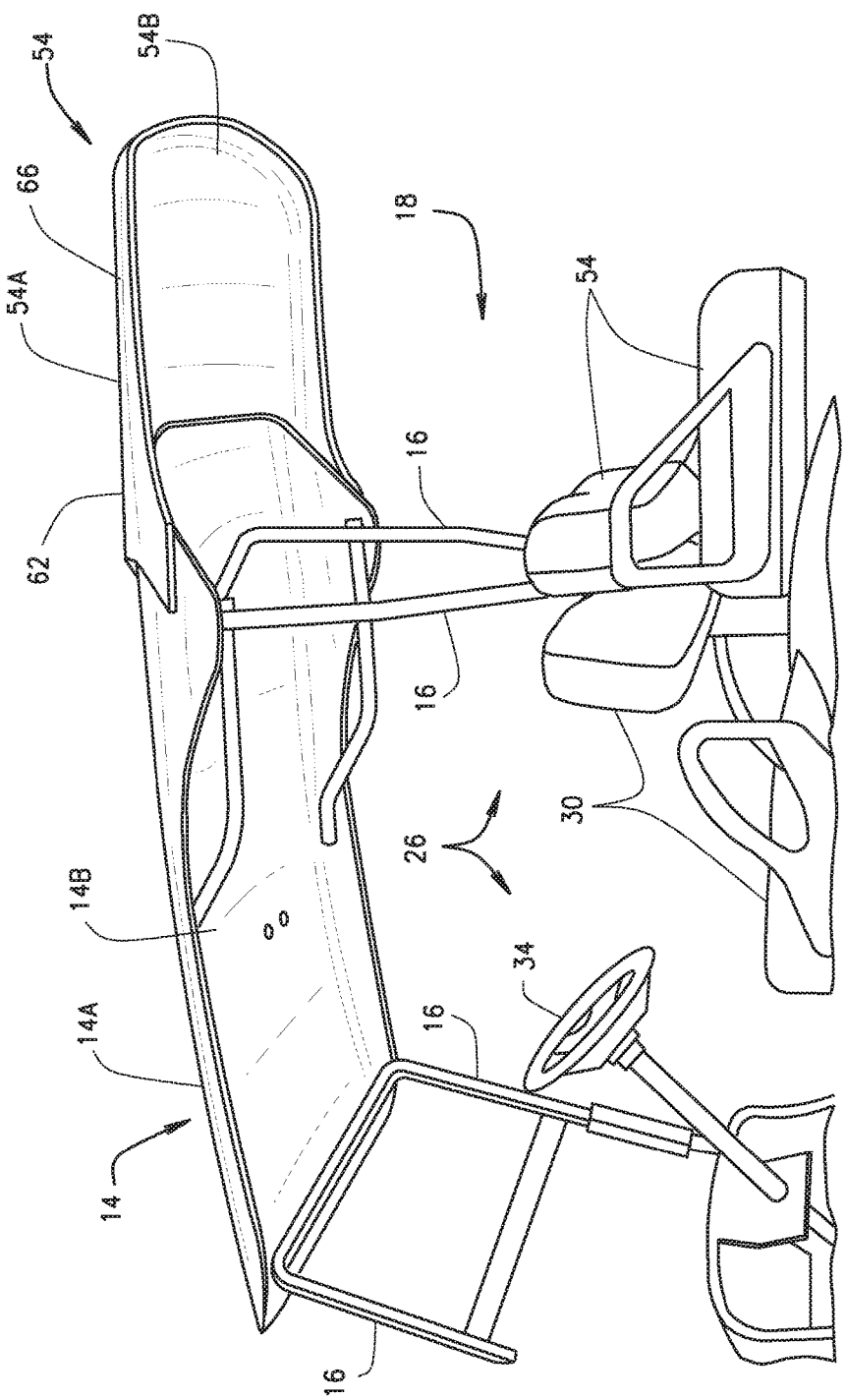
FIG. 4 is an isometric view of an underside of the cantilevered canopy extension system shown in FIG. 1 illustrating an extension panel of the system connected to a top surface of the main passenger compartment canopy of the vehicle, in accordance with various embodiments of the present disclosure.

Referring now to FIGS. 1, 2 and 4, the present disclosure provides a cantilevered canopy extension system 10 that is attachable, connectable, or mountable to a vehicle main passenger compartment canopy 14, and/or one or more main passenger compartment canopy support struts 16, to cover any area of the vehicle, or near the vehicle, other than area covered by the main passenger compartment 14, such as an auxiliary passenger seating area 18 of a vehicle 22, a golf bag well (not shown) of the vehicle, at least a portion of a cargo bed (not shown), or other cargo storage area of the vehicle, etc. Although it will be understood that the cantilever canopy extensions system 10, as described herein, can be attached to a main passenger compartment of a vehicle (e.g., the main passenger compartment 14 of the vehicle 22) to cover any area of the vehicle, or near the vehicle, other than the area covered by the main passenger compartment canopy (e.g., the main passenger canopy 14), for simplicity and by way of example only, the cantilever canopy extension system 10 will be described herein with regard to covering at least a portion of an auxiliary passenger seating area (e.g., the auxiliary passenger seating area 18).

The canopy extension system 10 is attachable, connectable, or mountable to the vehicle main passenger compartment canopy 14 and/or main passenger compartment canopy support struts 16, and is supported over the auxiliary passenger seating area 18 only by its attachment, connection or mounting to the main passenger compartment canopy 14 and/or main passenger compartment canopy support struts 16. That is, the canopy extension system 10 (e.g., an extension panel of the system 10) is supported and suspended over, e.g., cantilevered over, the auxiliary passenger seating area 18 solely by its attachment, connection or mounting to the main passenger compartment canopy 14 and/or main passenger compartment canopy support struts 16, without the need, use or implementation of any vertical or upward oriented support struts or other such structure employed for the purpose of supporting and suspending the canopy extension system 10 over the auxiliary passenger seating area 18. Hence, the weight of the canopy extension system (e.g., the weight of the extension panel), and the moment arm stresses and force vectors generated by the cantilevered canopy extension system 10 (e.g., the cantilevered extension panel) is born solely by the main passenger compartment canopy 14 and/or the main passenger compartment canopy struts 16.

In various instances, the vehicle 22 is generally an open cabin vehicle, such as a golf cart, a utility vehicle, a maintenance vehicle, a cargo vehicle, a shuttle vehicle, a personal transportation vehicle, a boat, etc., that includes a main passenger compartment or cabin 26, the auxiliary passenger seating area 18 disposed rearward (e.g., behind) the main passenger compartment 26, and the main passenger cabin canopy 14 deployed over a main passenger compartment 26. The main passenger compartment canopy 14 is mounted to the vehicle 22 and supported over, or above, the main passenger compartment 26 via the main passenger compartment canopy support struts 16, which are connected to the vehicle 22 (e.g., connected to at least one of the vehicle body and/or structural framework of the vehicle 22), as illustrated by way of example in FIGS. 1 and 2. In various instances, the main passenger compartment canopy support struts 16 can provide or comprise a roll over protection system (ROPS) for the vehicle 22. In such instances, the ROPS (e.g., the main passenger compartment canopy support struts 16) is disposed above and around at least a portion of the main passenger compartment 26 and is structured and operable to protect passengers within the main passenger compartment 26 in a situation where the vehicle 22 may be caused to overturn or roll over. In various instances herein, the combination of the main passenger compartment canopy 14, support struts 16 and cantilevered canopy extension system 10 will be referred to as the vehicle canopy assembly 28.

The main passenger compartment 26 generally includes a primary seating structure 30, a steering wheel 34 for use by the vehicle operator to control the directional movement of the vehicle 22, a brake pedal 38 for use by the vehicle operator to control slowing and stopping of the vehicle 22, and an accelerator pedal 42 for use by the vehicle operator to control the torque delivered by one or more vehicle prime mover(s) (not shown) to one or more rear wheel 46 and/or one or more front wheels 50. The auxiliary passenger seating area 18 generally includes an auxiliary seating structure 54 that can be attached to the rear portion of a vehicle 22 rearward (e.g., behind) the primary seating structure 30 to provide auxiliary, or additional, seating capacity for the vehicle 22. More particularly, the auxiliary seating structure 54 provides seating capacity in addition to that provided by a primary seating structure 30. The primary seating structure 30 is generally structured and operable to seat a vehicle operator (e.g., a driver) of the vehicle 22 and at least one passenger in a forward facing position (e.g., positioned or oriented to face toward the front of the vehicle 22).

It will be understood that, as used herein, the rear portion of the vehicle 22 is a portion of the vehicle behind, or rearward, of the primary seating structure 22. Furthermore, as used herein, the word "forward" and the phrase "forward of" are used to describe the direction from a named component or structure toward the front of the vehicle 22 along a longitudinal axis of the vehicle 22. Similarly, as used herein, the word "rearward" and the phrase "rearward of" are used to describe the direction from a named component or structure toward the rear of the vehicle 22 along the longitudinal axis of the vehicle 22.

Referring now to FIGS. 1, 2, 3 and 4, the cantilevered canopy extension system 10 generally comprises an extension panel 54 that is connectable to the main passenger compartment canopy 14, and at least one connector assembly 58 structured and operable to connect (e.g., fixedly connect) the extension panel 54 to the main passenger compartment canopy 14, as described below. The extension panel 54 is structured to be connectable to a top surface 14A (FIG. 1) and/or a bottom surface 14B (FIG. 6) of the main passenger compartment canopy 14, and/or at least one of the main canopy support struts 16.

In various embodiments, the cantilevered canopy extension system 10 is structured such that when the extension panel 54 is connected to the main passenger compartment canopy 14, as described herein, the extension panel 54 provides an extension of the main passenger compartment canopy 14. That is, the cantilevered canopy extension system 10 is structured such that when the extension panel 54 is connected to the main passenger compartment canopy 14 and/or main canopy strut(s) 16, as described herein, there is little or substantially no difference between a top surface 54A of the extension panel 54 and the top surface 14A of the main passenger canopy 14, and/or there is little or substantially no difference between a bottom surface 54B of the extension panel 54 and the bottom surface 14B of the main passenger canopy 14. For example, in some embodiments, the difference between the top surface 54A of the extension panel 54 and the top surface 14A of the main passenger canopy 14, and/or the difference between bottom surface 54B of the extension panel 54 and the bottom surface 14B of the main passenger canopy 14 can be merely approximately or less than the thickness of the extension panel head section 62.

More particularly, when the extension panel 54 is connected to the main passenger compartment canopy 14 and/or main canopy strut(s) 16, as described herein, a height from the ground surface on which the vehicle 22 sits to the top surface 54A of the extension panel 54 is approximately the same as the height from the ground surface to the top surface 14A of the main passenger canopy 14, and/or a height from the ground surface on which the vehicle 22 sits to the bottom surface 54B of the extension panel 54 is approximately the same as the height from the ground surface to the bottom surface 14B of the main passenger canopy 14. For example, in various instances, a difference in height from the ground surface to the top surface 14A of the main passenger canopy 14 and from the ground surface to the top surface 54A of the extension panel 54, and/or from the ground surface to bottom surface 14B of the main passenger compartment canopy 14 and from the ground surface to the bottom surface 54B, of the extension panel 54 can be between about 0.0 inches and about 2.0 inches. Even more particularly, when the extension panel 54 is connected to the main passenger compartment canopy 14 and/or main canopy strut(s) 16, as described herein, a longitudinal line (e.g., a line substantially parallel to the length of the vehicle 22) running along the top surface 54A of the extension panel 54 will have substantially the same trajectory as a longitudinal line running along the top surface 14A of the main passenger compartment canopy 14, and/or a longitudinal line running along the bottom surface 54B of the extension panel 54 will have substantially the same trajectory as a longitudinal line running along the bottom surface 14B of the main passenger compartment canopy 14, such that the top surface 54A and/or bottom surface 54B of the extension panel 54 substantially provides an extension of the top surface 14A and/or the bottom surface 14B of the main passenger compartment canopy 14, and the extension panel 14 substantially provides an extension of the main passenger compartment canopy 14.

Figure 3:
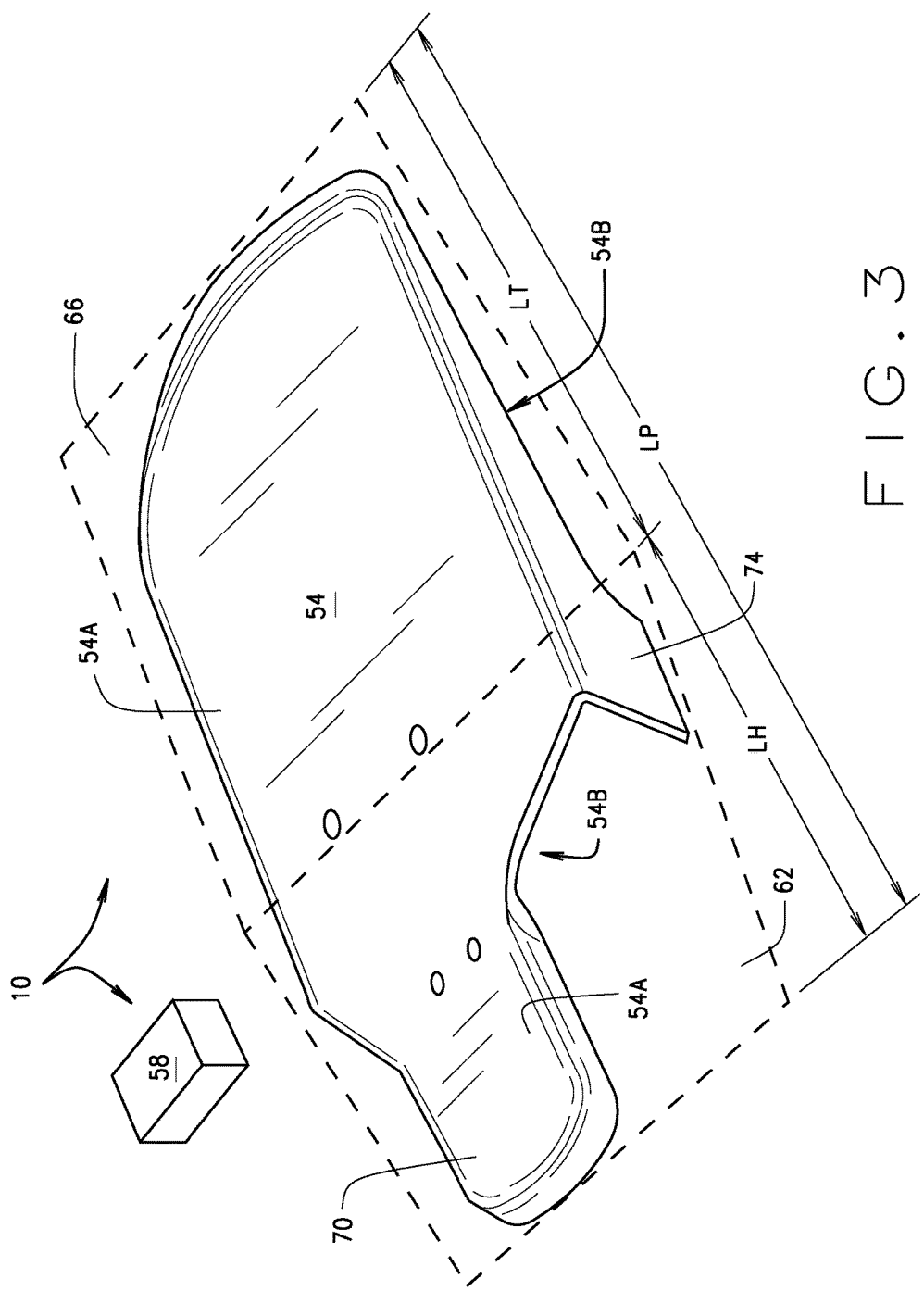
FIG. 3 is an isometric schematic of the cantilevered canopy extension system shown in FIGS. 1 and 2, in accordance with various embodiments of the present disclosure.

The connector assembly(ies) 58 can be any connector assembly(ies), mechanism(s), device(s), apparatus(es), etc., suitably structured and operable to connect the extension panel 54 to the main passenger compartment canopy 14 and/or one or more of the main canopy support struts 16 such that at least a portion of the extension panel 54 (e.g., a tail portion described below) is cantilevered beyond an edge (e.g., a back edge) of main canopy 14. Hence, the connector assembly(ies) 58 is/are shown in FIG. 3 by way of example merely as a generic black box representative of any such suitable connector assembly(ies) 58. Although the extension panel 54 is shown by way of example in FIG. 3 as being cantilevered from (e.g., extending from) a rearward edge (or end) of the main passenger compartment canopy 14, in various embodiments, the canopy extension system 10 can be structured and operable and configured such that the extension panel 54 can be cantilevered from (e.g., extended from) a forward edge (or end) of the main passenger compartment canopy 14, either side edge of the main passenger compartment canopy 14, or any two or more of the rearward, forward and side edges of the main passenger compartment canopy 14.

Referring now to FIG. 3, the extension panel 54 includes a head section 62 that is structured to overlap at least a portion of the main passenger compartment canopy 14 and connect the extension panel to the main canopy 14 and/or at least one main canopy support struts 16. Particularly, the head section 62 is structured to overlap at least a portion of the top surface 14A (shown in FIG. 1) and/or the bottom surface 14B (shown in FIG. 6) of the main passenger compartment canopy 14. The extension panel 54 additionally includes a cantilever tail section 66 that extends from the head section 62. The extension panel 54 is structured such that the tail section 66 can be cantilevered from an edge (e.g., the rearward edge) of the main passenger compartment canopy 14 when the head section 62 is connected to the main passenger compartment canopy 14 and/or at least one of the main passenger compartment canopy struts 16. The head and tail sections 62 and 66 extend from each other in a substantially coplanar fashion or configuration (inclusive of any decorative or otherwise contour of the top surface 54A of the extension panel 54) such that the top surface 54A (inclusive of any decorative or otherwise contour of the top surface 54A of the extension panel 54) of the extension panel 54 encompasses, and is common to, both the head and tail sections 62 and 66, and forms, and provides, a single, common top surface for both the head and tail sections 62 and 66 (inclusive of any decorative or otherwise contour of the top surface 54A of the extension panel 54). Similarly, the head and tail sections 62 and 66 extend from each other in a substantially coplanar fashion or configuration (inclusive of any decorative or otherwise contour of the bottom surface 54B of the extension panel 54) such that a bottom surface 54B (inclusive of any decorative or otherwise contour of the bottom surface 54B of the extension panel 54) of the extension panel 54 encompasses, and is common to, both the head and tail sections 62 and 66, and forms, and provides, a single, common bottom surface for both the head and tail sections 62 and 66 (inclusive of any decorative or otherwise contour of the bottom surface 54B of the extension panel 54).

As generically illustrated by way of example, by the dashed line shown in FIG. 3, the extension panel 54 can have any desired and suitable shape, size and dimensions and is not limited to the shape, size and dimensions shown in the various figures by way of example. Moreover, as generically illustrated by way of example, by the dashed line shown in FIG. 3, the head and tail sections 62 and 66 can each respectively have any desired and suitable shape, size and dimensions and are not limited to the shape, size and dimensions shown in the various figures by way of example. By way of example, in various embodiments, the head section 62 of the extension panel 54 can comprise at least one tongue portion 70 that extends along at least a portion of the main passenger canopy (e.g., a single tongue portion that extends along a center section of the main passenger compartment canopy 14), and/or a pair of opposing locating wings 74 that extend downward along opposing sides of the main passenger compartment canopy 14 and/or along at least a portion of one or more of the main canopy struts 16 when the extension panel 54 is positioned for connection to the main passenger compartment canopy 14. In such embodiments, the locating wings 74 can be structured as guides to center and properly locate the extension panel 54 on main passenger compartment canopy 14 when connecting the extension panel 54 to main passenger compartment canopy 14.

The head section 62 and the tail section 66 of the extension panel 54 each have a longitudinal length LH and LT, respectively, that cumulatively equals a longitudinal length LP of the extension panel 54. In various embodiments, the length LH of the head section 62 can be greater than the length LT of the tail section 66. Conversely, in various embodiments, the length LT of the tail section 66 can be greater than the length LH of the head section 62. For example, in various instances the tail section length LT can be 1.1 to 5.0 times longer than the head section length LH. As an example, in various embodiments, the tail section length LT can be twice as long (or greater) as the head section length LH (e.g., the tail section length LT can be ⅔ (or greater) and the head section length LH can be ⅓ (or less) of the panel length LP).

As described above, the connector assembly(ies) 58 can be any connector assembly(ies), mechanism(s), device(s), apparatus(es), etc., suitably structured and operable to connect the extension panel 54 to the main passenger compartment canopy 14 and/or one or more of the main canopy support struts 16 such that at least a portion of the extension panel 54 (e.g., a tail portion described below) is cantilevered beyond an edge (e.g., a back edge) of main canopy 14. For example, as shown in FIGS. 1 and 2, in various instances the connector assembly(ies) 58 can comprise a plurality of fastening means (e.g., screws, or rivets, bolts, studs, clips, hooks and/or the like) (referred to herein as fastening means 58) that are inserted through holes in the head section 62 of the extension panel 54 and secured to the main passenger compartment canopy 14 and/or at least one main passenger compartment strut 16, thereby connecting to extension panel 54 to the main passenger compartment canopy 14 such that the tail section 66 of the extension panel 54 extends beyond and is cantilevered from an edge (e.g., a rearward edge) of the main passenger compartment canopy 14. Hence, only the fastening means are utilized to install the extension panel. Particularly, only the structure, shape and/or material strength of the extension panel 54 is utilized to support the cantilevered portion of the tail section 66. That is, no vertical or upward oriented support struts or other such structure are employed for the purpose of supporting and suspending the cantilevered portion of the tail section 66 beyond the edge (e.g., the rearward edge) of the main passenger compartment canopy 14.

For example, in the instances wherein the head section 62 of the extension panel 54 includes the tongue 70 and locating wings 74, once the extension panel 54 has been placed in contact with the main passenger compartment canopy 14, and centered/located utilizing the locating wings 74, at least one fastening means 58 (e.g., at least one screw, rivet, or bolt) can be inserted through a corresponding hole in the tongue 70 and secured to (e.g., screwed to, riveted to, or bolted to) the main passenger compartment canopy 14 and/or at least one of the main passenger compartment canopy struts 16. Additionally or alternatively, at least one fastening means 58 (e.g., at least one screw, rivet, or bolt) can be inserted through a corresponding hole in each of the locating wings 74 and secured to (e.g., screwed to, riveted to, or bolted to) the main passenger compartment canopy 14 and/or at least one of the main passenger compartment canopy struts 16. Accordingly, the extension panel 54 is secured to the main passenger compartment canopy 14 and/or at least one main passenger compartment strut 16 such that at least portion of the extension panel tail section 66 extends beyond and is cantilevered from an edge (e.g., a rearward edge) of the main passenger compartment canopy 14 without the employment of vertical or upward oriented support struts or other such structure to support the cantilevered portion of the tail section 66 beyond the edge (e.g., the rearward edge) of the main passenger compartment canopy 14.

Figure 5:
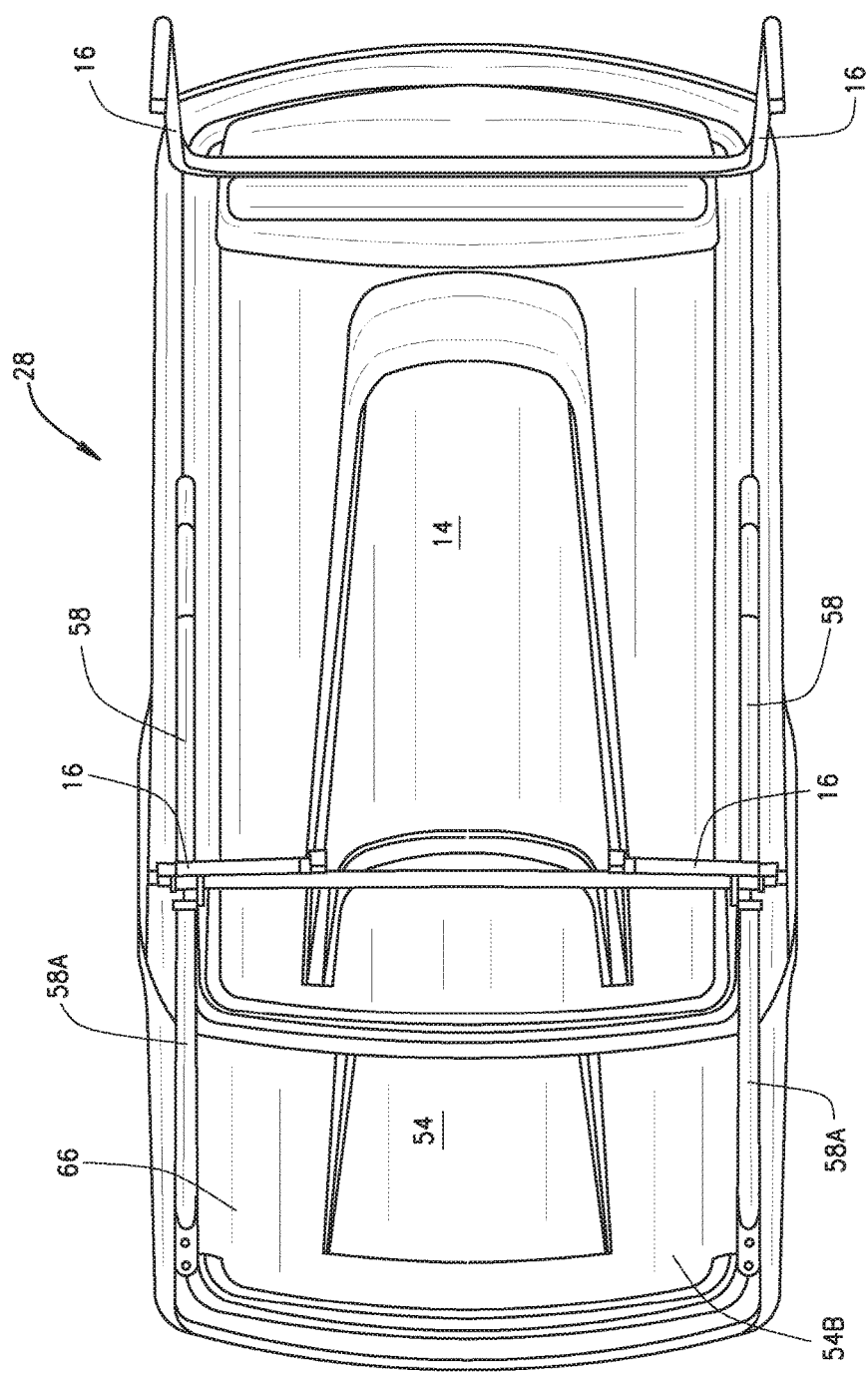
FIG. 5 is a bottom view of the cantilevered canopy extension system shown in FIG. 1 illustrating a connector assembly of the system, in accordance with various embodiments of the present disclosure.

Alternatively, as shown by way of example in FIG. 5, in various embodiments the connector assembly(ies) 58 can comprise at least one (e.g., a pair of) support arms (referred to herein as support arm(s) 58) that is/are mountable (via, screws, rivets, bolts, etc.) to and along the top surface 14A and/or the bottom surface 14B of the main passenger compartment canopy 14 such that an extension section, or end, 58A of each support arm 58 is cantilevered beyond the edge (e.g., the rearward edge) of the main passenger compartment canopy 14. Once the support arm(s) 58 is/are mounted to the top and/or bottom surface 14A and/or 14B of the main passenger compartment canopy 14 the extension panel tail section 66 can be mounted to the extension section, or end, 58A of each respective support arm 58. That is, the extension section, or end, 58A of each respective support arm 58 can be mounted (via, screws, rivets, bolts, etc.) to the respective top surface 14A and/or bottom surface 14B of the extension panel tail section 66 to thereby mount the extension panel 54 to the main passenger compartment canopy 14. Accordingly, the extension panel 54 is secured to the main passenger compartment canopy 14, and/or at least one main passenger compartment strut 16, such that at least a portion of the extension panel tail section 66 extends beyond and is cantilevered from an edge (e.g., a rearward edge) of the main passenger compartment canopy 14 without the employment of vertical or upward oriented support struts or other such structure to support the cantilevered portion of the tail section 66 beyond the edge (e.g., the rearward edge) of the main passenger compartment canopy 14. Particularly, only the support arm(s) 58, the structure, shape and/or material strength of the extension panel 54 is/are utilized to support the cantilevered portion of the tail section 66.

It is envisioned that, in various embodiments, extension panel head section 62 is bifurcated to comprise two substantially parallel sleeve panels roughly separated by a thickness of the main canopy such that a sleeve or pocket or envelope is formed in the head section 62 such that the extension panel head section 62 can be slid onto the main canopy 14 such that a portion of main canopy 14 is disposed between, or sandwiched between sleeve panels to support the cantilevered tail section 66. Accordingly, the extension panel 54 is secured to the main passenger compartment canopy 14 and/or at least one main passenger compartment strut 16 such that at least a portion of the extension panel tail section 66 extends beyond and is cantilevered from an edge (e.g., a rearward edge) of the main passenger compartment canopy 14 without the employment of vertical or upward oriented support struts or other such structure to support the cantilevered portion of the tail section 66 beyond the edge (e.g., the rearward edge) of the main passenger compartment canopy 14. Particularly, only the substantially parallel sleeve panels, the structure, shape and/or material strength of the extension panel 54 is/are utilized to support the cantilevered portion of the tail section 66.

In various instances, the main passenger compartment canopy 14 can comprise water drainage system including one or more water (or fluid, e.g., rain) drainage channels 78 (see FIG. 1) that are structured and operable to collect and direct water (or other fluid, e.g., rain) toward the corners of the main passenger compartment canopy 14 (or otherwise away from the main passenger compartment 26). In various embodiments, the extension panel 54 is structured such that when the extension panel 54 is mounted to the main passenger compartment canopy 14, as described herein, the drainage channels 78 are unimpeded. That is, the extension panel 54 of such embodiments is structured such that when the extension panel 54 is mounted to the main passenger compartment canopy 14 water is allowed to flow within the drainage channels 78, between the main passenger compartment canopy 14 and the extension panel 54 such that the water (or fluid, e.g., rain) will drain from the main passenger compartment canopy 14 via the water drainage system of the main passenger compartment canopy 14.

It is envisioned that in various instances the extension panel 54 can include one or more drainage channel that are effectively fluidly coupled to drainage channels 78 of the main passenger canopy 14 such that water (or other fluid, e.g., rain) on the extension panel 54 can flow along the extension panel drainage channels to main passenger compartment canopy drainage channels 78 so that the top surface of the extension panel 54 is drained by the water drainage system of main passenger compartment canopy 14 (e.g., drained via the drainage channels 78).

The description herein is merely exemplary in nature and, thus, variations that do not depart from the gist of that which is described are intended to be within the scope of the teachings. Moreover, although the foregoing descriptions and the associated drawings describe example embodiments in the context of certain example combinations of elements and/or functions, it should be appreciated that different combinations of elements and/or functions can be provided by alternative embodiments without departing from the scope of the disclosure. Such variations and alternative combinations of elements and/or functions are not to be regarded as a departure from the spirit and scope of the teachings.

What is claimed is:

1. A canopy extension system attachable to a vehicle main passenger compartment canopy, said system comprising:
   an extension panel connectable to a main canopy of a vehicle such that the extension panel provides an extension of the main canopy whereby a top surface of the extension panel is substantially coplanar to a top surface of the main canopy, the extension panel comprising:
   a head section structured to overlap at least a portion of the main canopy, and connect to the main canopy; and
   a cantilever tail section substantially coplanarly extending from the head section such that the cantilevered tail section is cantilevered from an edge of the main canopy when the head section is connected to the main canopy; and
   at least one connector assembly structured to connect the head section to the main canopy such that the cantilever tail section will be cantilevered from the edge of the main canopy.

2. The system of claim 1, wherein a length of the cantilever tail section is greater than a length of the head section.

3. The system of claim 1, wherein the head section of the extension panel is structured to overlap at least a portion of a top surface of the main canopy.

4. The system of claim 1, wherein the head section of the extension panel is structured to overlap at least a portion of a bottom surface of the main canopy.

5. The system of claim 1, wherein the at least one connector assembly comprises at least one support arm mountable along at least one of a bottom surface and a top surface of the main canopy such that an extension section of the at least one support arm is cantilevered beyond the edge of the main canopy and is connectable to a respective at least one of a bottom surface and a top surface of the cantilevered tail section of the extension panel.

6. The system of claim 1, wherein the head section of the extension panel comprises at least one of at least one tongue portion that extends along a least a portion of the main canopy, and a pair of opposing locating wings that extend downward along opposing sides of the main canopy when the extension panel is positioned for connection to the main canopy.

7. The system of claim 6, wherein the at least one connector assembly comprises a plurality of fastening means, wherein at least one of the fastening means connects the at least one tongue portion to the main canopy, and at least one of the fastening means connects each of the opposing locating wings to the respective opposing sides of the main canopy.

8. The system of claim 1, wherein the extension panel is structured to allow water to flow between the main canopy and the extension panel such that the water will drain from the main canopy via a water drainage system of the main canopy.

9. A vehicle canopy assembly, said assembly comprising:
a main passenger compartment canopy system structured to cover a main passenger compartment of a vehicle, the main passenger compartment seating canopy system comprising:
a main passenger compartment canopy; and
a plurality of main passenger compartment canopy support struts that are structured to connect the main passenger compartment canopy to at least one of a body and structural framework of the vehicle such that the main passenger compartment canopy is supported above the main passenger compartment; and
a canopy extension system attachable to the vehicle main passenger compartment canopy to cover at least one of an area of the vehicle and an area near the vehicle, other than the area covered by the main passenger compartment, the canopy extension system comprising:
an extension panel connectable to a main canopy of the vehicle, such that the extension panel provides an extension of the main canopy whereby a top surface of the extension panel is substantially coplanar to a top surface of the main canopy, the extension panel comprising:
a head section structured to overlap at least a portion of the main canopy, and connect to the main canopy; and
a cantilever tail section substantially coplanarly extending from the head section such that the cantilevered tail section is cantilevered from an edge of the main canopy when the head section is connected to the main canopy; and
at least one connector assembly structured to connect the head section to the main canopy such that the cantilever tail section will be cantilevered from the edge of the main canopy.

10. The assembly of claim 9, wherein a length of the cantilever tail section is greater than a length of the head section.

11. The assembly of claim 9, wherein the head section of the extension panel is structured to overlap at least a portion of one of a top surface of the main passenger compartment canopy and a portion of a bottom surface of the main passenger compartment canopy.

12. The assembly of claim 9, wherein the at least one connector assembly comprises a pair of support arms that are mountable along at least one of a bottom surface and a top surface of the main passenger compartment canopy such that an extension section of each support arm is cantilevered beyond the edge of the main passenger compartment canopy and is connectable to a respective at least one of a bottom surface and a top surface of the cantilever tail section of the extension panel.

13. The assembly of claim 9, wherein the head section of the extension panel comprises at least one of at least one tongue portion that extends along a least a portion of the main canopy, and a pair of opposing locating wings that extend downward along opposing sides of the main canopy when the extension panel is positioned for connection to the main canopy.

14. The assembly of claim 13, wherein the at least one connector assembly comprises a plurality of fastening means, wherein at least one of the fastening means connects the at least one tongue portion to the main canopy, and at least one of the fastening means connects each of the opposing locating wings to the respective opposing sides of the main canopy.

15. The assembly of claim 9, wherein the extension panel is structured to allow water to flow between the main passenger compartment canopy and the extension panel such that the water will drain from the main passenger compartment canopy via a water drainage system of the main passenger compartment canopy.

16. A vehicle, said vehicle comprising:
a main passenger compartment for seating at least a driver of the vehicle;
one of an auxiliary passenger seating area, a golf bag well, and a cargo bed located rearward of the main passenger compartment for seating one or more vehicle passengers; and
a canopy assembly configured to cover the main passenger compartment and at least a portion of the one of the auxiliary passenger seating areas, the golf bag well, and the cargo bed, said assembly comprising:
a main passenger compartment canopy system structured to cover a main passenger compartment of a vehicle, the main passenger compartment seating canopy system comprising:
a main passenger compartment canopy; and
a plurality of main passenger compartment canopy support struts that are structured to connect the main passenger compartment canopy to at least one of a body and structural framework of the vehicle such that the main passenger compartment canopy is supported above the main passenger compartment; and
a canopy extension system attachable to the vehicle main passenger compartment canopy to cover the at least a portion of the one of the auxiliary passenger seating areas, the golf bag well, and the cargo bed, the canopy extension system comprising:
an extension panel connectable to a main canopy of the vehicle, such that the extension panel provides an extension of the main canopy whereby at least a portion of a top surface of the extension panel is substantially coplanar to a top surface of the main canopy, the extension panel comprising:
a head section structured to overlap at least a portion of the main canopy, and connect to the main canopy; and
a cantilever tail section extending substantially parallel to and from the head section such that the cantilevered tail section is cantilevered from an edge of the main canopy when the head section is connected to the main canopy; and at least one connector assembly structured to connect the head section to the main canopy such that the cantilever tail section will be cantilevered from the edge of the main canopy.

17. The vehicle of claim 16, wherein a length of the cantilever tail section is greater than a length of the head section.

18. The vehicle of claim 16, wherein the head section of the extension panel is structured to overlap at least a portion of one of a top surface of the main passenger compartment canopy and a portion of a bottom surface of the main passenger compartment canopy.

19. The vehicle of claim 16, wherein the at least one connector assembly comprises a pair of support arms that are mountable along at least one of a bottom surface and a top surface of the main passenger compartment canopy such that an extension section of each support arm is cantilevered beyond the edge of the main passenger compartment canopy and is connectable to a respective at least one of a bottom surface and a top surface of the cantilever tail section of the extension panel.

20. The vehicle of claim 16, wherein the extension panel is structured to allow water to flow between the main passenger compartment canopy and the extension panel such that the water will drain from the main passenger compartment canopy via a water drainage system of the main passenger compartment canopy.

\* \* \* \* \*